US006438616B1

United States Patent
Callsen et al.

(10) Patent No.: US 6,438,616 B1
(45) Date of Patent: Aug. 20, 2002

(54) METHOD AND APPARATUS FOR FAST, LOCAL CORBA OBJECT REFERENCES

(75) Inventors: Christian J. Callsen, Redwood City; Ken M. Cavanaugh, Montara, both of CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 08/993,800

(22) Filed: Dec. 18, 1997

(51) Int. Cl.[7] .................................................. G06F 9/00
(52) U.S. Cl. ...................................................... 709/316
(58) Field of Search .............................. 395/186, 702, 395/710, 701, 650; 709/304, 203, 101, 315, 316, 310

(56) References Cited

U.S. PATENT DOCUMENTS

| | | |
|---|---|---|
| 4,823,310 A | 4/1989 | Grand |
| 5,263,160 A | 11/1993 | Porter, Jr. et al. |
| 5,455,951 A | 10/1995 | Bolton et al. |
| 5,475,845 A | 12/1995 | Orton et al. |
| 5,734,903 A | 3/1998 | Saulpaugh et al. |
| 5,740,355 A | 4/1998 | Watanabe et al. |
| 5,748,963 A | 5/1998 | Orr |
| 5,758,342 A | 5/1998 | Gregerson |
| 5,761,670 A | 6/1998 | Joy |
| 5,787,251 A * | 7/1998 | Hamilton et al. ........... 709/203 |
| 5,787,447 A | 7/1998 | Smithline et al. |
| 5,790,848 A | 8/1998 | Wlaschin |
| 5,815,703 A | 9/1998 | Copeland et al. |
| 5,819,093 A | 10/1998 | Davidson et al. |
| 5,835,906 A | 11/1998 | Hagersten et al. |
| 5,848,234 A * | 12/1998 | Chernick et al. ........... 709/203 |
| 5,848,236 A | 12/1998 | Dearth et al. |
| 5,864,866 A | 1/1999 | Henckel et al. |
| 5,873,116 A | 2/1999 | Van Fleet |
| 5,881,315 A | 3/1999 | Cohen |
| 5,913,038 A | 6/1999 | Griffiths |
| 5,915,252 A | 6/1999 | Misheski et al. |
| 5,926,775 A | 7/1999 | Brumley et al. |
| 5,928,323 A | 7/1999 | Gosling et al. |
| 5,933,605 A | 8/1999 | Kawano et al. |
| 5,978,940 A | 11/1999 | Newman et al. |
| 5,991,823 A * | 11/1999 | Cavanaugh, III et al. ... 709/330 |
| 6,038,593 A * | 3/2000 | Huckins ..................... 709/217 |
| 6,044,224 A * | 5/2000 | Radia et al. ................. 717/162 |

OTHER PUBLICATIONS

The Portable Object Adapter, Apr. 21, 1997, ORB Portability Joint Submission, Part 1 of 2, orbos.
The Common Object Request Broker: Architecture and Specification, Jul. 1995, Corba V2.0.
Bull et al., Life Cycle and Association Services Specification, Feb. 19, 1993, Joint Object Services Submission.
Chin et al., Distributed Object–Based Programming Systems, Mar. 1991, vol. 23, No. 1.
Silicon Graphics, Iterators, 1996, http:www.rt.e–technik.tu–darmstadt.de/~mali–dOC/STL_doc/iterators.html, pp 1–3.
IONA Technologies, Ltd., Orbix, Oct. 29, 1996, Dublin, Ireland.

* cited by examiner

Primary Examiner—St. John Courtenay, III
Assistant Examiner—Lewis A. Bullock, Jr.
(74) Attorney, Agent, or Firm—Beyer Weaver & Thomas, LLP

(57) ABSTRACT

Methods and apparatus for reducing computing overhead by creating fast, local-only objects in a distributed client/server based computing system are disclosed. In one aspect of the invention, within an object-based computing system, a method for creating an object reference that is associated with a local-only servant object includes implementing a first base class to create a first object that represents the object reference, and obtaining a local-only create closure. An operation is called on a second base class using the local-only create closure. The operation creates a server-side representation associated with the local-only servant object, and is stored in the first object that represents the object reference. In one embodiment, creating the local-only create closure includes creating a skeleton object and calling a local m-table builder for the skeleton object.

25 Claims, 10 Drawing Sheets

METHOD AND APPARATUS FOR FAST, LOCAL CORBA OBJECT REFERENCES

CROSS REFERENCE TO RELATED APPLICATIONS

The following U.S. patent applications are related to the present application and are incorporated by reference herein in their entirety: U.S. patent application Ser. No. 08/993,075, entitled "Method and Apparatus for Deferred Throwing of Exceptions in C++"; U.S. patent application Ser. No. 08/993, 205, entitled "Method and Apparatus for Constructing Stable Iterators in a Shared Data Collection"; U.S. patent application Ser. No. 08/993,263, entitled "Marshaling and Unmarshaling Framework for Supporting Filters in a Distributed Object System"; U.S. patent application Ser. No. 08/993,206, entitled "Method and Apparatus for Enforcing Locking Invariants in Multi-Threaded Systems"; U.S. patent application Ser. No. 08/993204, entitled "Method and Apparatus for Efficient Representation of Variable Length Identifiers in a Distributed Object System"; and U.S. patent application Ser. No.08/993,287, entitled "Method and Apparatus for Executing Code During Method Invocation"; all filed on even date, and U.S. patent application Ser. No. 08/554,794, filed Nov. 7, 1995 as a continuation to application Ser. No. 07/995,863, filed Dec. 21, 1992 (now abandoned); U.S. patent application Ser. No. 08/670,682, filed Jun. 26, 1996, U.S. patent application Ser. No. 08/673, 181, filed Jun. 26, 1996; U.S. patent application Ser. No. 08/670,700, filed Jun. 26, 1996; U.S. patent application Ser. No. 08/670,681, filed Jun. 26, 1996 U.S. patent application Ser. No. 08/670,684, filed Jun. 26, 1996; and U.S. patent application Ser. No. 08/669,782, filed Jun. 26, 1996.

BACKGROUND OF THE INVENTION

1. Field of Invention

The invention relates generally to methods and apparatuses for locally invoking objects in distributed object systems. More particularly, the invention relates to methods and apparatuses for efficiently enabling local object references to be created and invoked within a distributed object system.

2. Description of the Relevant Art

A computing environment in which objects are located on different computers linked by a network is typically referred to as a client-server computing environment. Some of the computers act as providers of services or functionality to other computers. The providers of service or functionality are known as "servers" and the consumers of the service or functionality are called "clients." The client-server model may also be generalized to the case where distinct programs running on the same computer are communicating with one another through some protected mechanism and are acting as providers and consumers of services or functionality.

Attempts to provide such a distributed system have been made using object-oriented methodologies that are based upon a client-server model in which server objects provide interfaces to client objects that make requests to server objects. Typically, in such a distributed system, the servers are objects consisting of data and associated methods. The client objects obtain access to the functionalities of the server objects by executing calls on them, which calls are mediated by the distributed system. When the server object receives a call, it executes the appropriate method and transmits the result back to the client object. The client object and server object communicate through an Object Request Broker (ORB) which is used to locate the various distributed objects and to establish communications between objects. Distributed objects may exist anywhere in a network, as for example, in the address space of the client, in multiple address spaces on the client machine, and in multiple machines across the network.

The software industry has responded to the need for a distributed object technology by forming the Object Management Group (OMG). The goal of the OMG is to define the Object Management Architecture (OMA), which has four major components: the Object Request Broker (ORB), Object Services, Common Facilities, and Application Objects. The Object Request Broker provides basic object communications and management services, thereby forming the basis of a distributed object system. A standard for an Object Request Broker is contained in the Common Object Request Broker Architecture (CORBA) specification from the OMG, Revision 2.0, updated July 1996, which is incorporated herein by reference in its entirety. The CORBA specification generally defines an object model on top of a programming language, e.g., C++ or Java™ (developed by Sun Microsystems, Inc. of Palo Alto, Calif.), in which server objects have references which may be exported to clients. Within the object model, clients and servers are "roles," and are typically not mutually exclusive tasks for a single program. Instead, a program may be both a client and a server.

Within an object-based system such as a distributed object system, a single server object may be accessed by multiple clients. FIG. 1a is a diagrammatic representation of two clients which are arranged to invoke a single server object in accordance with prior art. A first client 104 is essentially a program which is running in a first process 108. First client 104 may invoke a server object 112 that is running in a second process 116. A non-local invocation may be performed on object 112 by first client 104. Object 112 may be an object defined under the CORBA specification. When invoked, object 112 is arranged to service a request from first client 104. A request from first client 104 is typically marshaled for transport to object 112, and unmarshaled once it is received by object 112. A second client 120, which is within second process 116 and, hence, is in the same process as object 112, may also invoke object 112. An invocation on object 112 by second client 120 is a local invocation.

Since first client 104 and second client 120 are arranged such that they may invoke object 112 at substantially the same time, it is generally necessary to synchronize calls to object 112. In other words, calls to object 112 must typically be synchronized in order to prevent threads associated with first client 104 and second client 120 from operating concurrently on object 112. Calls to object 112 may be synchronized by object managers included within a distributed object system, as will be appreciated by those skilled in the art. Synchronization processes which are used to synchronize calls to object 112 from first client 104 and second client 120 are often expensive and time-consuming, as synchronization processes require substantial computational overhead and processing.

Object 112 may generally support a variety of different features, e.g., object 112 may create object references outside of second process 116. In general, an object reference 124 may be created by object 112 such that object reference 124 is associated with client 104. Reference 124 includes a pointer 126 to a client representation reference 128 which, in turn, includes a pointer to object 112. Reference 124 is utilized by client 104 in order to invoke object 112. As will be appreciated by those skilled in the art, reference 124 may remain constant. However, object 112, which services client 104, may change over time, e.g., object 112 may have a life span which is less than the life span of second process 116. Hence, "invoking" on reference 124 may cause a new object to be created, if object 112 no longer exists. By way of example, object 112 may represent any row in a data base, and reference 124 may refer to a particular row in the data base. As such, reference 124 is essentially "bound" to an object that represents a particular row in the data base. Therefore, each time reference 124 is invoked, an associated object must generally be "looked up," or otherwise located. Whenever the row referred to by reference 124 is referenced, a new object which represents the row is created in the event that object 112 is no longer alive.

First process 108 and second process 116 are often separated by a computer network. Since the overhead associated with network communications is often relatively high, the overhead associated with synchronizing calls to object 112, as well as the overhead associated with locating object 112 based on reference 124, is relatively insignificant when compared to the overhead associated with network communications.

An object within a process may also be invoked by multiple clients which are within the same process. Specifically, an object may be such that it is accessible only to clients which are within the same process, e.g., the server process, as the object. An object that is accessible only to clients within the same process may be a locality-constrained object, which is an object associated with portable object adapters (POAs) as specified in standards issued by the OMG, e.g., OMG document orbos/97-04-14, chapter 3, which is incorporated herein by reference in its entirety. With reference to FIG. 1b, the invocation of an object by clients within the same process as the object will be described in accordance with prior art. A servant object 154 is present within a process 158, and is unable to create object references outside of process 158. These object references are then considered to be locality-constrained, as they are bound to the process that created them. A number of clients 162, each of which has an associated object reference (not shown) relating to object 154, within process 158 may simultaneously attempt to invoke object 154.

When client 162a invokes object 154, invocation requests associated with client 162a and object 154 are typically marshaled for transport to object 154 and unmarshaled after they are received by object 154. An invocation request may be marshaled for transport to object 154, and unmarshaled for receipt by object 154. Such marshaling and unmarshaling is time-consuming and, as a result, affects the performance of an invocation performed on object 154.

Clients 162 are also often "synchronized" such that only one client, e.g., client 162a, may access object 154 at one time. However, as a process typically has only a single, associated thread, process 158 and, hence, clients 162, have only a single associated thread. As such, when object 154 is accessible only to clients 162 within the same process 158, attempts at synchronization are both time consuming and unnecessary.

For an object which is accessible only to clients that are local to the object, i.e., an object which can be accessed only by clients which share the same process as the object, implementing and invoking the object in the same manner as an object which may be locally and non locally invoked is inefficient and may result in significant overhead. Specifically, when a particular object in a process is known to be unable to create object references outside of the process, providing the object with capabilities and features associated with object references created outside of the process may prove to be both inefficient and expensive. There is a trade-off between the features associated with the object and the speed at which the invocation of the object can occur. By way of example, for an object which can only be locally invoked, thread synchronization, as well as marshaling and unmarshaling locally invoked objects, is both time-consuming and inefficient when an object may only be locally invoked. Therefore, what is desired is a fast, efficient method for locally invoking an object from within the same process as the object, when the object is not arranged to create references outside of the process.

SUMMARY OF THE INVENTION

To achieve the foregoing and in accordance with the purpose of the present invention, methods and devices for reducing computing overhead by creating fast, local-only objects in a distributed client/server based computing system are disclosed. In one aspect of the invention, within an object-based computing system, a method for creating an object reference that is associated with a local-only servant object includes implementing a first base class to create a first object that represents the object reference, and obtaining a local-only create closure. An operation is called on a second base class using the local-only create closure. The operation creates a server-side representation associated with the local-only servant object, and is stored in the first object that represents the object reference. In one embodiment, creating the local-only create closure includes creating a skeleton object and calling a local m table builder for the skeleton object.

In accordance with another aspect of the present invention, a method for invoking a local-only object associated with a servant in an object-based computing system includes determining whether a first pointer from the local-only object to the servant is null, and raising an exception when it is determined that the first pointer from the local-only object to the servant is null. The exception is arranged to indicate that the first pointer from the local-only object to the servant is null. The method also includes invoking a first method on the servant when it is determined that the first pointer from the local-only object to the servant is not null.

In one embodiment, the method also includes storing a copy of a second pointer to a client representation in the local-only object, and calling a servant method on the local-only object. In such an embodiment, the method may also include calling a pre-local method associated with the local-only object, and storing a copy of the second pointer to the client representation in the local-only object. Calling the pre-local method may include storing a copy of a server representation associated with the servant.

According to still another aspect of the present invention, a customization object in an object-based system may be arranged to be invoked only by a client which is in a first process with the customization object. Such a customization object includes a pre-local method that stores a copy of a representation of the customization object, a post-local method associated with the pre-local method, and a servant method that is arranged to check for a pointer from the client to the customization object.

BRIEF DESCRIPTION OF THE DRAWINGS

The invention, together with further advantages thereof, may best be understood by reference to the following description taken in conjunction with the accompanying drawings.

DETAILED DESCRIPTION OF THE EMBODIMENTS

Figure 1A:
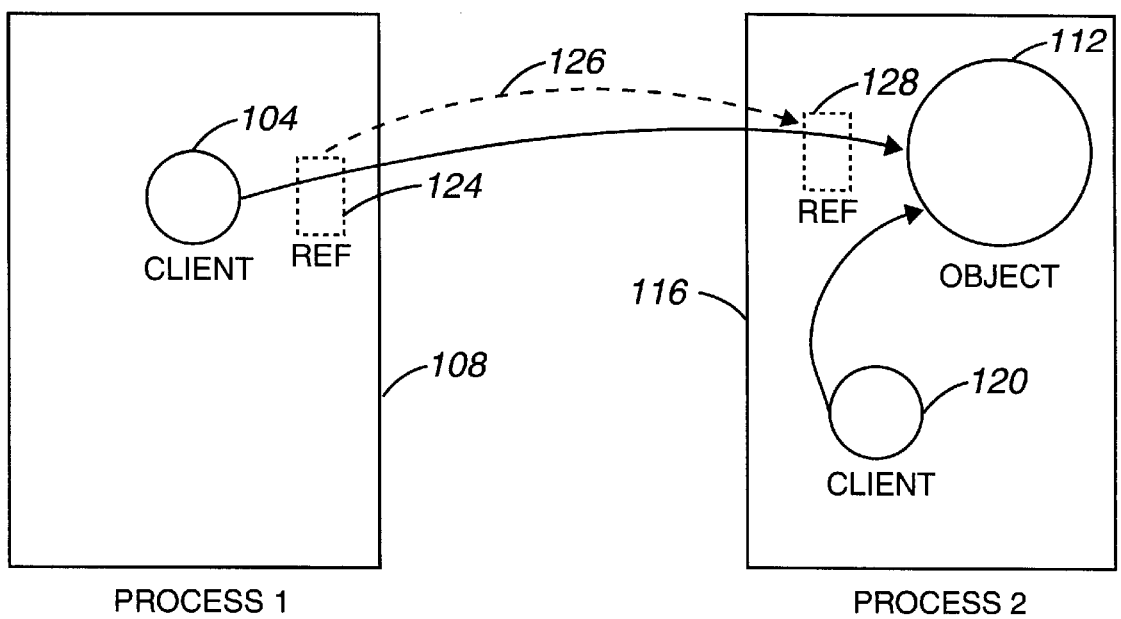
FIG. 1a is a diagrammatic representation of an interface between an object and both local and non-local clients in accordance with prior art.
Figure 1B:
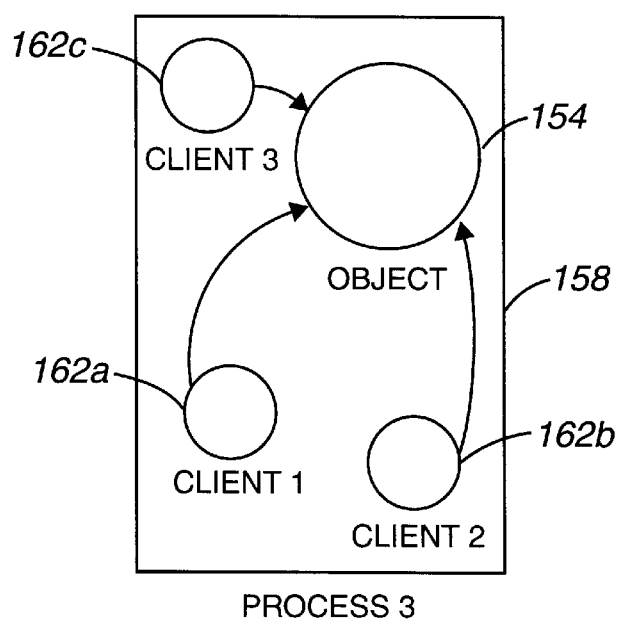
FIG. 1b is a diagrammatic representation of an interface between an object and multiple clients which are local to the object in accordance with prior art.
Figure 2A:
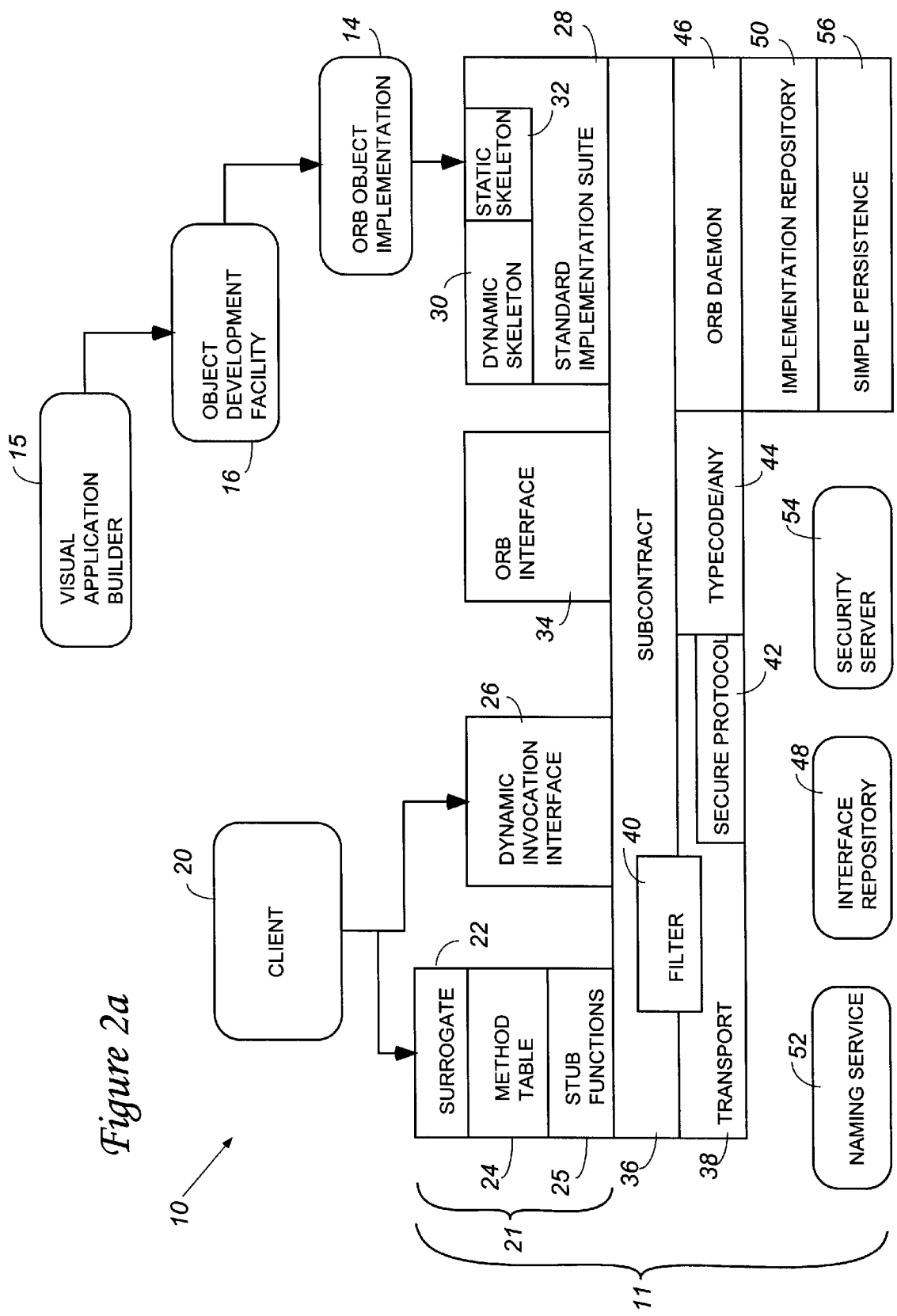
FIG. 2a is a symbolic overview of a distributed object system.
Figure 2B:
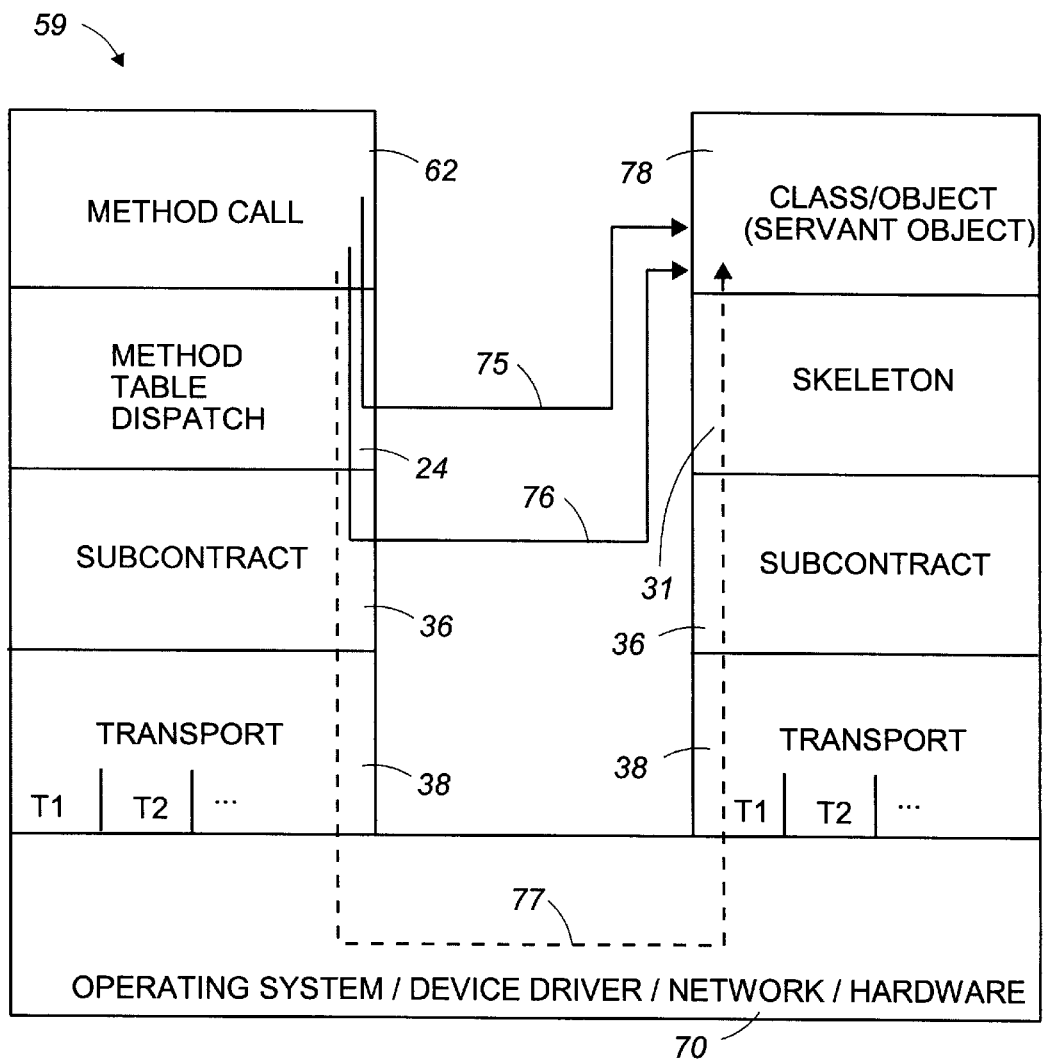
FIG. 2b is a diagrammatic illustration which represents how a request by a client is routed through the architecture of a client side and a server side of a distributed object system, and the interface between the client side and the server side of the distributed object system.
Figure 2C:
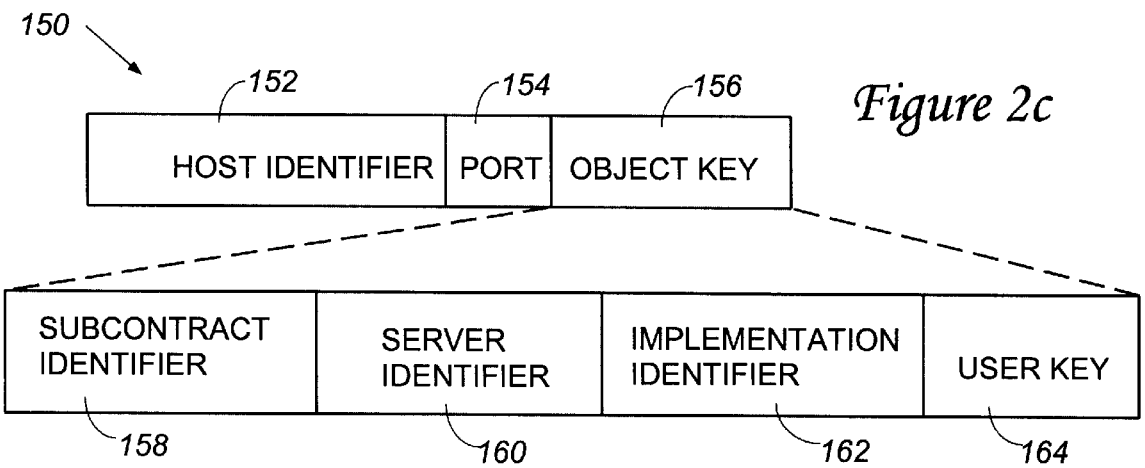
FIG. 2c is a diagrammatic representation of an object reference.

The present invention is directed toward object-based systems and will be described with reference to several embodiments as illustrated in the accompanying drawings. The invention may be practiced within the context of any suitable object-based systems, including distributed object systems such as those defined under the Common Object Request Broker Architecture (CORBA) or any other suitable specification. However, for purposes of illustration, the present invention will be described primarily within the context of an Object Request Broker (ORB) implemented under the CORBA specification from the OMG, Revision 2.0, updated July 1996, which is incorporated herein by reference. FIG. 2a diagrammatically illustrates the overall architecture of a representative distributed object system suitable for implementing the present invention. FIG. 2b diagrammatically illustrates some possible flow paths that a request from a client to a servant object may follow within such an architecture that includes a three level dispatch mechanism. FIG. 2c shows one object reference data structure that may be used by a client to refer to a servant object.

A distributed object system 10 typically includes an Object Request Broker (ORB) 11 as is symbolically illustrated in FIG. 2a. ORB 11 provides all of the location and transport mechanisms and facilities necessary to deliver a call from a client to a servant (target object) and to return a response to the client, as will be discussed below with reference to FIG. 2b. The client and servant may be located in the same process, in different processes on the same machine, or on completely different machines. For the purposes of this discussion, client 20 may be any code that invokes an operation on a distributed object and thus may or may not take the form of distributed object or a process. Normal object implementation 14 is a representation of an object type defined in a traditional object programming language, such as C++. A wide variety of representations are possible. By way of example, an object implementation 14 may be a simple C++ object type that has been provided by an application developer. Alternatively, an implementation for an object type may be developed within a visual application builder 15. This visual application builder allows a developer to visually select existing object types from a catalog and graphically connect the services provided by one object to the services needed by another (attributes, arguments, etc.) in order to create a new implementation for an object type.

An object development facility 16 may be used to simplify the creation and the installation of distributed objects. It is used to "wrap" or encapsulate developer objects in distributed object code. As such, object development facility 16 may be used to transform a developer object into an ORB object implementation 14. In this example, ORB object implementation 14 is presented as a server as shown by its location in the diagram. A developer uses an interface definition language to define an interface for an ORB object, provides a developer object implementation that implements that object's behavior, and then uses the object development facility in order to produce an ORB object implementation 14. At run time, an instance of this ORB object (a servant object) is created that will utilize this ORB object implementation 14. It should be appreciated that the object development facility may also be used to create objects that take the role of clients at some point.

Client 20 communicates with a servant by way of a stub 21, a method table dispatch 24, a subcontract layer 36, possibly a filter 40, and a transport layer 38. Stub 21 includes a surrogate 22, a method table 24, and a stub function 25. Client 20 communicates initially with surrogate 22 which appears to the client as the server object. Alternatively, client 20 may communicate directly with the server object through a dynamic invocation interface (DII) 26 instead of through surrogate 22, method table 24, and stub function 25. Dynamic invocation interface 26 is used to enable clients, as for example client 20, to construct dynamic requests. One procedure by which a client makes a call to a servant utilizing the above layers is described in more detail below with reference to FIG. 2b.

Subcontract layer 36 provides the functionality required by an object in order to utilize subcontracts to implement various services (or features or object mechanisms) named by a particular subcontract, as described in greater detail in above-referenced U.S. patent application Ser. No. 08/554,794, filed Nov. 7, 1995. A subcontract identifies a quality of service provided by the distributed object system that may be utilized by an individual object. For example, a subcontract may identify that the feature of security is to be used for a particular object. A technique by which a particular subcontract may be associated dynamically at run time with a servant object is described in above-referenced U.S. patent application Ser. No. 08/670,682, filed Jun. 26, 1996, which is incorporated herein by reference. Filter 40, if being used, may perform a variety of tasks, such as compression, encryption, tracing, or debugging, which are to be applied to communications to and from an object.

Transport layer 38 operates to marshal, unmarshal and physically transport information to and from a servant that typically does not share the same process as a client. A technique for marshaling/unmarshaling an object reference is described in above-referenced U.S. patent application Ser. No. 08/670,681, filed Jun. 26, 1996, which is incorporated herein by reference. Mechanisms for marshaling and unmarshaling are described in above-referenced U.S. patent application Ser. No. 08/673,181, filed Jun. 26, 1996, which is incorporated herein by reference.

A standard implementation suite 28 (or object adapter) represents a set of subcontracts that interact with ORB object implementations 14 in identical ways, as for example object key management. One such implementation suite is described in above-referenced U.S. patent application Ser. No. 08/669,782, filed Jun. 26, 1996, which is incorporated herein by reference. It should be duly noted that a subcontract may belong to multiple implementation suites. Hence, other implementation suites that utilize different subcontracts are possible. A skeleton, which may take the form of either static skeleton 32 or dynamic skeleton 30 is used to transform requests into a format required by an ORB object implementation 14, e.g., a servant object. Thus, skeletons 32, 30 call an appropriate ORB object implementation 14. Static skeleton 32 is used to call interface-specific object implementations 14, while dynamic skeleton 30 is used generically when interface-specific objects are not available. An ORB interface 34 is the interface that goes directly to the ORB that is the same for all ORBs and does not depend upon an object's interface or object adapter. An ORB Daemon 46 is responsible for ensuring that object servers are active when invoked by clients. A technique for starting object servers is disclosed in U.S. patent application Ser. No. 08/408,645 which is hereby incorporated by reference.

Secure Protocol 42 is a secure interoperability protocol that secures the internet inter-ORB protocol and helps to transmit information through transport layer 38 in a secure fashion. This may mean integrity protection, confidentiality, etc. The internet inter-ORB protocol is a protocol that typically communicates between processes on different machines. However, in some cases, the internet inter-ORB protocol may communicate between process on the same machine. The security server 54 is a security administration server that secures the services that are used between processes on different computers.

Typecode/Any module 44 implements typecode and "Any" objects. Typecode describes an Interface Definition Language (IHDL) data type, allowing type descriptions to be transmitted between clients and servers. An instance of an IDL data type may be encapsulated by an "Any" object. An Any object refers to typecode of the encapsulated data, and a generic encoding of the data.

An implementation repository 50 is used to store information relating to object servers. Specifically, implementation repository 50 stores the information needed to start a server process. For example, implementation repository 50 stores information such as the location of the server program, any arguments to the program, and any environment variables to pass to the program, etc.

Simple persistence 56 uses an Interface Definition Language (IDL)-defined type and the output from running that IDL type through the IDL compiler, together with a portion of additional code so that an IDL-defined type can be read from, and written to, disk. A name server 52 is used to name ORB objects. A client, as for example client 20, may use name server 52 to find a desired object by name. Name server 52 returns an object reference, which in turn may be used to send requests to that object. An Interface Repository 48 (IFR) knows about all interfaces for all objects within the distributed object system.

A request made by a client using a method table ("m-table") dispatch will pass through a variety of the aforementioned layers of the architecture on its way to the servant as diagrammatically illustrated in FIG. 2b. The request is initiated by a client and may take any suitable form. The form of the request will depend to a large extent upon the nature of the programming language used to create the client. By way of example, if the client is written in the C++ language, the request may take the form of a C++ method call 62. The call is made to a designated object reference taking the form of a surrogate. The surrogate includes methods that comply with the object's interface. As will be appreciated by those skilled in the art, the object reference used at different locations within a distributed object system may vary significantly in appearance. In the embodiment described, the client side object reference is a dual pointer (referred to herein as a "fat pointer").

A fat pointer contains two distinct pointers, or location indicators. A first pointer points to a client representation ("client rep") associated with the referenced object. A second pointer points to a method table of the method table dispatch 24 that is associated with the referenced object. It should be appreciated that as used herein, the term "pointer" is used to identify not only locations in computer or network memory, but also to refer to a location indicator in general. A client representation is an object that has methods which support invocation as well as CORBA defined "pseudo" object reference operations. These operations include, but are not limited to, a duplicate method, a release method, a narrow method, a hash method, and an is_equivalent method.

After the client has initiated a call, the call is processed using a method table dispatch mechanism 24. Such a technique is disclosed in U.S. patent application Ser. No. 08/307, 929, and is hereby incorporated by reference. The method table dispatch mechanism uses a method table that contains a list of pointers to stub functions 25, one of which is associated with the method to be invoked. Stub functions 25 receive a function or procedure call in the "native" language of the client process, then use either a subcontract layer 36 or a native call to eventually call the corresponding servant object. The native language may be any suitable language, as for example a language such as C++.

Method table dispatch 24 determines the appropriate stub function 25 to process the method call, and then pairs the method call with the appropriate stub function 25. In the event that the client making the method call is in the same process as the servant object, a local stub function is called. The local stub function sends the method call directly to servant object 78. A technique for routing calls within a local process is described in above-referenced U.S. patent application Ser. No. 08/670,684, filed Jun. 26, 1996, which is incorporated herein by reference. Alternatively, if the servant object is in a different process, i.e., a remote process, a remote stub function is called. The remote stub function invokes the client representation, which delivers the invocation to servant object 78.

Subcontracts implemented by subcontract layer 36 are logic modules which provide control of the basic mechanisms of object invocation and argument passing that are important in distributed object systems. A subcontract implemented by subcontract layer 36 determines a specific quality of service for use by an object. A subcontract is uniquely identified by a subcontract identifier, which is typically embedded in an object reference. A quality of service is a set of service properties. Among possible service properties which are selectable are qualities relating to server activation, security, transactions, filterability, and clean shut-down. Subcontracts are configured such that certain qualities of service are available. With predetermined qualities of service, the overhead associated with processing individual service properties is reduced. Realistically, only "reasonable" or commonly used combinations of service properties are supported with subcontracts. However, subcontracts may be created to meet the specific requirements of a given distributed object system.

The identification of an appropriate subcontract in subcontract layer 36 may be thought of as the identification of a desired function that is unique to that subcontract. For example, a marshal function or an unmarshal function is defined for each subcontract. A subcontract marshal function is used by a stub to marshal an object reference so that it may be transmitted to another address space, or domain. The object reference is typically processed by a transport mechanism in transport layer 38.

A transport mechanism such as T1, T2, etc., which is a part of the transport layer 38, is used to marshal and physically transport information to and from servant objects. Information, i.e. the object reference or the request, is converted into protocols appropriate to a given domain. By way of example, protocols may include, but are not limited to, Ethernet protocols and internet interoperable protocols (IIOPs). In some uncommon cases, protocols may even entail the use of electronic mail to transmit instructions to be implemented on a server. After information is marshaled, the transport mechanism then transports information through any combination of an operating system, a device driver, or a network, that are all a part of hardware 70 used by the client side of a distributed object system. While transport mechanisms require a conversion of information into a protocol appropriate to a given domain, some transport mechanisms to do not require the encoding of information for different domains. One transport mechanism which does not require a conversion of information into a protocol appropriate to a domain other than the one on which information originates is termed a "door". Doors are essentially gateways between two different processes on the same host. The use of doors eliminates the need for a conversion of information into a canonical implementation in transport layer 38, as there is no need to encode information into a protocol which may be used by a different machine by virtue of the fact that information is remaining on the same host and therefore does not require a change of domain. Hence, information may simply be "flattened out," or marshaled into a stream which is not encoded for use by a different machine, and passed between the two processes on the host.

Once information is transported through hardware 70 used by the client side, the information is then transported to hardware 70 on the server side of a distributed object system. Once information is routed through hardware 70, the server side of a distributed object system invokes a transport mechanism such as T1, T2 etc. to receive information on an end point which is a part of transport layer 38. In the event that an end point is not created by transport layer 38, transport layer 38 provides the functionality needed for the end point to be created by subcontract layer 36. By way of example, a door end point is typically created by subcontract layer 36, while other end points, including network and TCP/IP end points, are typically created by transport layer 38. Regardless of whether end points are created by subcontract layer 36 or transport layer 38, end points "live in," i.e., are a part of, transport layer 38. End points are essentially ports which receive information from a different domain. After an end point in transport layer 38 receives information transported from a different domain, the end point then dispatches the information from transport layer 38 to subcontract layer 36. Subcontract layer 36, or more specifically the subcontract in subcontract layer 36 which receives the information, then dispatches the information to the skeleton and the servant.

Subcontract layer 36 provides the functionality to unmarshal at least some of the information it has received. That is, subcontract layer 36 unmarshals at least part of the request. Then, the request is dispatched to a skeleton 31 which transforms the request into an implementation specific format require red by servant object 78. The skeleton may either be a static skeleton or a dynamic skeleton as described above.

In general, a remote request must be routed through the client side and the server side as described above. The method call 62 is received, method table dispatch layer 24 is used to identify an appropriate subcontract prior to the selection of a transport mechanism in transport layer 38 which marshals the request and prepares it for trans port to another domain. Through hardware 70, the emarshaled request is transported to the server side where it is received on an end point which is a part of transport layer 38. An appropriate end point receives information transported across a wire, and information is dispatched from transport layer 38 to subcontract layer 36, which provides the functionality to at least partially unmarshal the information it has received. The subcontract then dispatches the request to skeleton 31 which transforms the request into a specific format required by servant object 78. This path is shown by arrow 77, and is the path which may be taken by both remote and local requests.

However, if a client and a server are in a local process, i.e., both the client and the server are in the same process, the use of the path shown by arrow 77 as described above is unnecessarily complex. If it is known that the client and the server are in the same process, it is possible to shorten the invocation, or flow, path of a request for service. If a local process may be identified when an object reference is created, shortened flow paths, i.e., the paths represented by arrows 75 and 76, may be taken to send a request from what is a client to a server which are on the same host. The path represented by arrow 76 is more likely to be taken, as it uses subcontract layer 36 to identify an appropriate subcontract. However, in situations in which an appropriate subcontract does not need to be explicitly identified, the path represented by arrow 75 may be taken.

FIG. 2c will now be used to describe one embodiment of an object reference. As will be familiar to those skilled in the art, object references may take a variety of forms depending upon the location within the process that they are being held at any given time. However, by way of background, one embodiment of a representative object reference for use in a system as described above with respect to FIG. 2a is illustrated in FIG. 2c. In the implementation shown therein, object reference 150 includes a host identifier 152, a port designation 154, and an object key 156. Object key 156 includes a subcontract identifier 158, a server identifier 160, an implementation identifier 162, and a user key 164. Host identifier 152 denotes a particular computer in a network, while port designation 154 identifies the port of the selected computer which is to be used for communication. Object key 156 provides further identifying information used in order to locate a desired servant object on its host machine.

Server identifier 160 names a particular process or program in which the servant object resides, while user key 164 is a unique number or string used to locate the servant within the process named by server identifier 160. Subcontract identifier 158 is used to attach the protocol of a particular subcontract and its associated services with a servant, and implementation identifier 162 names an implementation of an interface that is to be used with that servant object.

Within an object-based framework, an object may be both locally invoked, i.e., invoked from within the same process as the object, and remotely invoked, i.e., invoked from a different process. When an object may be both locally invoked an remotely invoked, the object must generally support methods which facilitate the local and remote invocations. By way of example, the methods generally include methods arranged to synchronize the invocations of the object to prevent two threads from concurrently operating on the object. When a client and a server are not in the same process, a received request is routed through at least the transport layer of both the client and the server, and when the server process is on a different host, a hardware layer as well, as described in more detail in above-referenced U.S. patent application Ser. No. 08/670,684, filed Jun. 26,96.

Some objects may be arranged such that they may only be locally invoked. Objects which may only be locally invoked, i.e., local-only objects, typically include all substantially all features included in objects which may be both locally and remotely invoked. These features include features which are essentially only relevant to remote invocations, such as synchronization features. As the number and complexity of features associated with a local-only object affects the speed at which the object may be invoked and, further, the performance of the object, eliminating features which are not used by the local-only object may serve to enhance the performance of the object. Further, if a client and a server are local relative to one another, it is not necessary to route a received request through transport layers and hardware layers. A modified, shorter flow path may be utilized if a client and a server are in the same process, and a received request may be routed to an appropriate servant object from either the subcontract layer on the client side or from the m-table dispatch layer. Routing a received request through transport layers and hardware layers, which requires marshaling and unmarshaling of the request and reply, when it is unnecessary compromises the efficiency, and therefore the performance, of object invocation. By constructing the object references in an intelligent manner which effectively identifies whether the servant will be in the same process as the client, it is possible to utilize shorter flow paths if a client and a server are in the same process, as described in above-referenced U.S. patent application Ser. No. 08/670, 684, filed Jun. 26, 1996.

Many objects in an object-based system are customized. A skeleton with customization points generally enables a customization object, or an object which may be customized, to be created. Such a customization object may be a local customization object which may only be dispatched locally. A "normal," or standard, customization object includes multiple methods. While the methods may vary, the methods typically include a set_exception( ) method, a pre_local( ) method, a post_local( ) method, a pre_dispatch( ) method, a post_dispatch( ) method, and a_servant( ) method. When a customization object is created, the methods are inlined into the customization object.

The set_exception( ) method is arranged to make a copy of an exception, and is generally associated with remote invocations of an object. By way or example, a call to set_exception(exc) will make a copy of "exc" which may be passed to a remote client. For local invocations of the object, both the pre_local( ) method and the post_local( ) method are subcontract-independent. The pre_local( ) and post_local( ) methods are typically arranged to synchronize local invocations on an object. Further, the pre_local( ) method may increment the number of active local invocations on the object, while the post_local( ) method may decrement the number of active local invocations on the object. The pre_local( ) method may also be arranged to obtain the pointer to the object, and to store a copy of the representation of the object, e.g., create a client representation. The pre_local( ) method is generally called before a local dispatch occurs in order to gather any information, required by the local dispatch, e.g., pointer to the servant object, that is specific to a client representation. The pre_local( ) method is used to make certain that a servant pointer may be successfully obtained.

For remote invocations of the object, the pre dispatch( ) method and the post_dispatch( ) method are arranged to synchronize remote invocations. Like the pre_local( ) method described above, the pre_dispatch( ) method is typically arranged to obtain the pointer to the object. The methods associated with both local and remote invocations are included in a normal customization object, as normal customization objects may generally be invoked both locally and remotely. T arranged to return the pointer to the object, for both local and remote invocations. That is, in general, the_servant( ) method is arranged to be used by both local and remote invocations to dispatch invocations to a servant.

The standard customization object described above may be such that it may only be locally invoked and, hence, does not support remote invocations. For a customization object which is arranged only to be locally invoked, i.e., a local-only customization object, the methods associated with synchronizing invocations on the customization object, when inlined, are essentially non-existent. As mentioned above, the synchronization of invocations on an object which may only be locally invoked is unnecessary. A local-only object, which is smaller than a standard customization object, has a performance which is comparable to the performance of a C++ object.

The methods included in a local exception object may include a set_exception( ) method. Due to the fact that the set_exception( ) method should generally never be called during a local invocation, a call to the set_exception( ) method causes an exception to be raised. A pre_local( ) method and a post_local( ) method included in a local-only customization object are not arranged to synchronize invocations. Specifically, the pre_local( ) method is arranged to store a copy of a representation, e.g., the server representation, that is independent of the IDL type. The post_local( ) method essentially does nothing. As such, both the pre_local( ) method and the post_local( ) method may be inlined into essentially no code, as will be appreciated by those skilled in the art.

A pre_dispatch( ) method and a post dispatch( ) method associated with the local-only customization object, in essence, should not be called, due to the fact that the pre_dispatch( ) method and the post_dispatch( ) method are associated with synchronizing remote invocations. As such, in the event that either the pre_dispatch( ) method or the post dispatch( ) method is called, in one embodiment, the program which called the pre_dispatch( ) method or the post_dispatch( ) method may be aborted.

A_servant( ) method is arranged to check for a pointer from a client, i.e., the client which is invoking the local-only customization object, to the local-only customization object. Specifically, in one embodiment, if the pointer from the client to the local-only customization object is null, e.g., set to zero, then the local-only customization object is assumed not to exist, and an exception is raised. Otherwise, if the pointer to the object exists, e.g., the servant pointer, then the pointer is returned to the client which called the_servant( ) method, and invocation may be invoked directly on the pointer to the servant object. That is, substantially all that is needed to invoke on a servant object is a pointer to the servant object, assuming that the pointer is valid. The pointer is generated by keeping track of substantially the total number of client representations in existence within a process. When the number of client representations drops to zero, the servant object may then be deleted.

Figure 3:
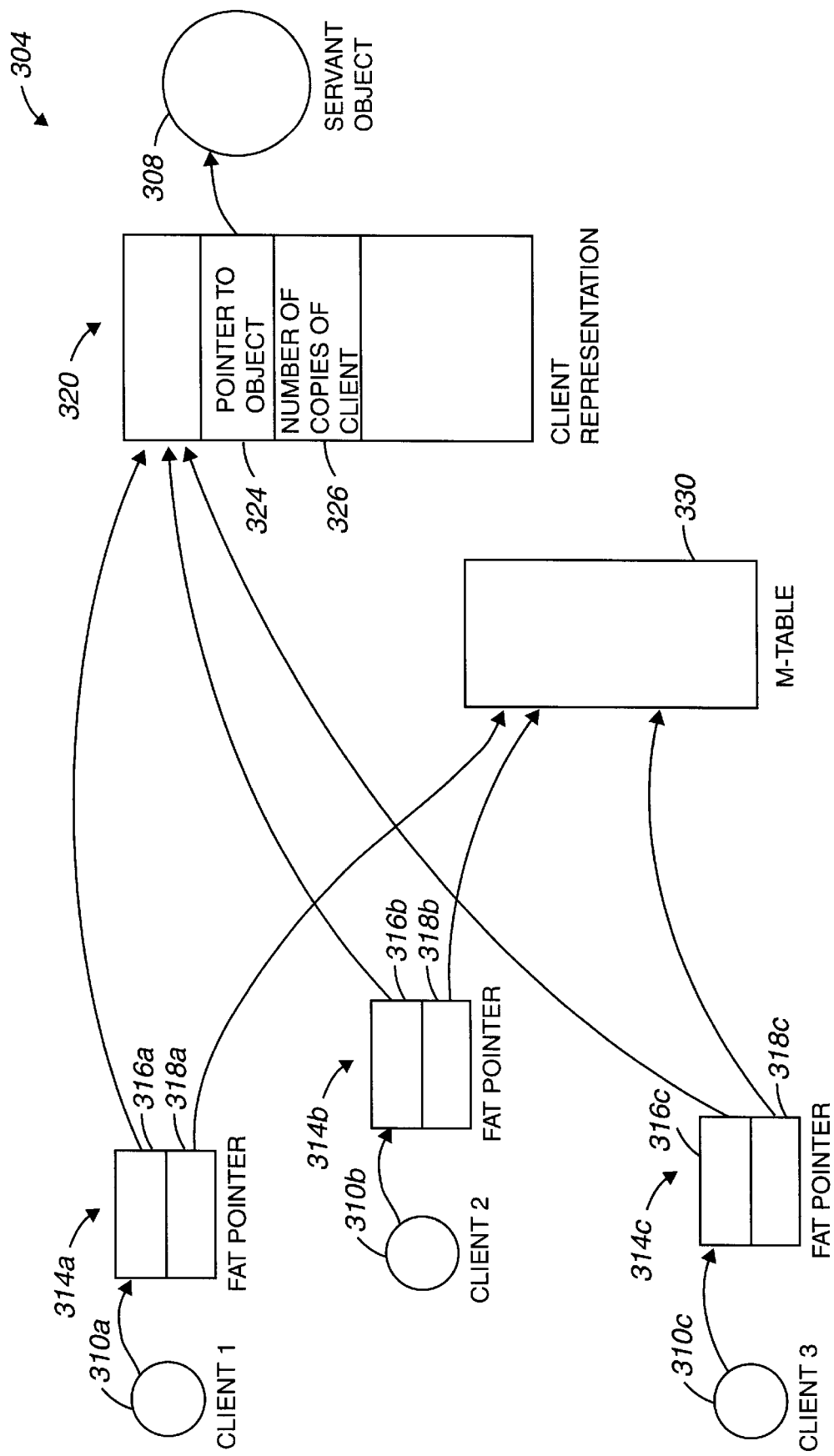
FIG. 3 is a diagrammatic representation of the interactions between a servant object and clients which are within the same process as the servant object in accordance with an embodiment of the present invention.

Local-only objects may interact in a variety of different ways. FIG. 3 is a diagrammatic representation of the interactions between a servant object and clients which are within the same process as the servant object in accordance with an embodiment of the present invention. A servant object 308 which supports only local invocations resides within a process 304. A multiplicity of clients 310 also resides within process 304. Servant object 308 is arranged to service requests from clients 310 which, in one embodiment, may all attempt to essentially invoke servant object 308 substantially simultaneously.

As mentioned above, an object reference may be used by a client, e.g., one of clients 310 to identify a servant object, e.g., servant object 308, to be invoked. In the described embodiment, object references which identify servant objects may be referred to as "dual" pointers or "fat" pointers 314. Each client 310a–c has an associated fat pointer 314a–c, respectively. Fat pointers 314a–c may also be considered to be CORBA object references. The size of each of the pointers included in fat pointers 314 will typically be dictated by the requirements of the system. By way of example, fat pointers 314 may each include eight bytes. That is, fat pointers 314 may often be pointer structures which each contain two "normal," i.e., four byte, pointers.

A first pointer 316 in each fat pointer 314 is a pointer to a client representation, or "client rep" 320. Client representation 320, which may be used during a call to a pre_local ( ) method or a_servant( ) method, as described above, is an object which has methods to support object invocation and CORBA defined "pseudo" object reference operations which include duplicate and narrow methods. Client representation 320 may be considered to be a representation of the servant object on the client. Hence, client representation 320 is associated with a servant. Specifically, in the described embodiment, when servant object 308 may only be locally invoked, client representation 320 includes a pointer 324 to servant object 308, as well as information 326 which relates to the number of client copies which are associated with client representation 320. In the described embodiment, since there are three clients 310, the number of client copies associated with client representation 320 is three. In the described embodiment, since servant object 308 may only be locally invoked, pointer 324 does not change, allowing overall system performance to increase.

In general, each object reference or fat pointer 314 has a single associated client representation 320, whereas each client representation 320 may be associated with more than one distinct fat pointer 314. The subcontract of client representation 320 may determine whether client representation 320 is associated with more than one fat pointer 314.

As shown, object references 314 have an associated method table, or "m-table," 330. A second pointer 318 in fat pointer 314 is an m-table pointer 318 that points to m-table 330. While m-table 330 may generally be either a local m-table or a remote m-table, in one embodiment, m-table 330 is local. In general, m-table 330 includes an array of pointers to methods used to determine the appropriate dispatch. M-table 330 may take on many different representations. By way of example, in some embodiments, m-table 330 may be "flat," or such that m-table 330 points directly to stub-functions, as will be appreciated by those skilled in the art. In other embodiments, m-table 330 may be tree-structured, i.e., m-table 330 may point to data structures which may point to stub functions which are not pointed to directly by m-table 330. It should be appreciated that a pointer for each method of a given interface is accessible from an m-table associated with the interface. Hence, if an m-table is tree-structured, it may be necessary to traverse the tree-structure of the m-table in order to find a pointer associated with the method.

In order to enable only local invocations to take place within a process, it is assumed that once created, a servant object does not change during its lifetime. The lifetime of a servant object is generally, at the most, the same as the lifetime of the process in which the servant object resides. When object references for such a servant object are created, an implementation embodies a pointer, e.g., a C++ pointer, or substantially any other suitable reference to the servant object, in an object reference. By embodying the servant pointer directly into the object reference, calls to a manager associated with the servant object may be eliminated. At invocation time, such an implementation involves checking that the servant pointer is valid, and directly invoking the servant pointer.

Figure 4:
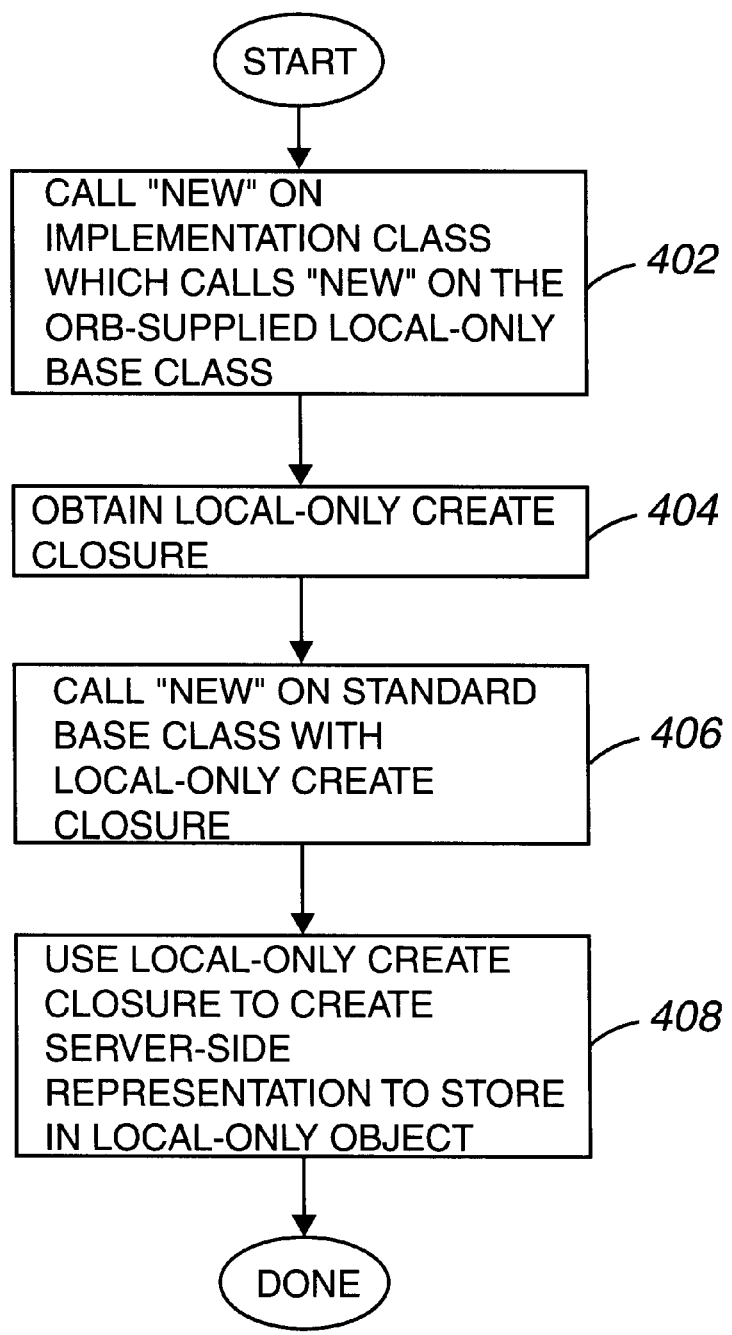
FIG. 4 is a process flow diagram which illustrates the steps associated with creating a local-only object reference in accordance with an embodiment of the present invention.

With reference to FIG. 4, the steps associated with the overall creation of a local-only object reference, or an object reference which may only be locally invoked, for a servant object will be described in accordance with an embodiment of the present invention. The process of creating a local-only object reference begins when the process that is creating the object calls "new" on an implementation class in step 402. In other words, a command is made to the implementation class to create a new object which represents a servant object. In the described embodiment, an implementation class is specific to a particular implementation of an object. Calling "new" on the implementation class causes "new" to be called on the local-only base class. Calling "new" on the local-base class generally serves to initiate the creation of a local-only object.

Classes are structured such that an implementation class inherits from a standard base class. The standard base class, in one embodiment, includes both a local-only base class and an ORB base class. In such an embodiment, the local-only base class may inherit from the ORB base class.

After "new" is called on the local-only base class, a local-only create closure is obtained in step 404. The steps associated with obtaining a local-only create closure will be described below with reference to FIG. 5. Once the local-only create closure is obtained, process flow moves to step 406 where "new" is called on the standard base class using the local-only create closure.

The local-only create closure is then used in step 408 to create a server-side representation, or server-side "rep," that is arranged to be stored in the local-only object. Specifically, a server-side representation is stored within the local-only object created in step 402. It should be appreciated that the server-side representation, in the described embodiment, is a local-only server-side representation. After the server-side representation is stored in the local-only object, the steps associated with creating a local-only object are completed.

By storing the local-only server-side representation within the local-only object, calls to the manager associated with the local-only object are unnecessary, as no manager is needed when invocations on the servant object are only local. That is, due to the fact that a manager, such as an object manager, is associated with marshaling and synchronizing objects, a manager for a local-only object, which is generally not marshaled or synchronized, is not used. Instead, when a local-only object is to be invoked by a client, a check is made to ensure that the appropriate servant pointer is valid. If the servant pointer is valid, then the servant pointer is directly invoked. The object manager is therefore built into the code used by the client to invoke on the local-only object, i.e., the code just described.

Figure 5:
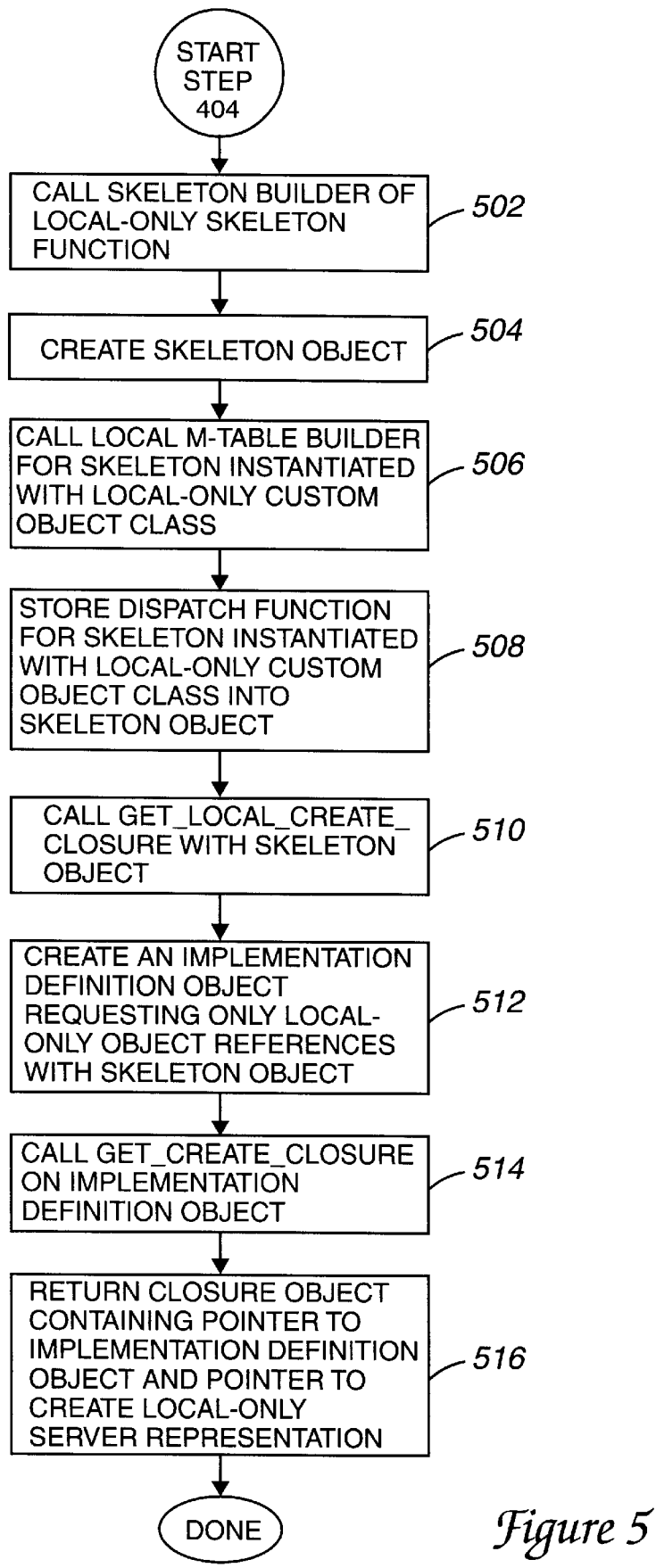
FIG. 5 is a process flow diagram which illustrates the steps associated with obtaining a local-only create closure, i.e., step 404 of FIG. 4, in accordance with an embodiment of the present invention.

FIG. 5 is a process flow diagram which illustrates the process of obtaining a local-only create closure, i.e., step 404 of FIG. 4, in accordance with an embodiment of the present invention. As previously mentioned, a local-only create closure is used to create a server-side representation which may be stored in a local-only object. The process of obtaining a local-only create closure begins at step 502 where a skeleton builder of a local-only skeleton function is called. The skeleton builder then creates a skeleton object, i.e., a local-only skeleton object, in step 504. As described above, a skeleton and, hence, a skeleton object, is generally arranged to transform requests into implementation specific formats required by a servant object.

Once the skeleton object is created in step 504, a call is made to an m-table builder for a skeleton in step 506. In one embodiment, the m-table builder is a local m-table builder which is essentially a template that is instantiated with a local-only custom object class. The local-only custom object class is provided by the ORB. The call to the m-table builder is made to create an m-table for the local-only custom object class. While the structure of the m-table created by the m-table builder may be widely varied, one embodiment of the m-table will be described below with reference to FIG. 8. As the object that is being created is a local-only object, the m-table is typically a local m-table. Accordingly, in one embodiment, the m-table builder used to create the m-table is a local m-table builder.

In step 508, a dispatch function for the skeleton instantiated with the local-only custom object class is stored. The dispatch function is generally defined by the skeleton that is generated by an IDL compiler. As such, when the skeleton is instantiated with the local-only custom object class, the dispatch function becomes a function which may be stored. Accordingly, the dispatch function, or, more specifically, a pointer to the dispatch function, is stored into the skeleton object created in step 504. In the described embodiment, the dispatch function will generally not be used, since the local-only object may only be locally invoked, and calls will neither need to be transformed nor dispatched to the local-only object. However, the inlining of pre_local( ) and post_local( ) methods when the methods are expanded into the local m-table associated with the dispatch function reduces the overall computational overhead associated with invoking local-only objects.

After the dispatch function is stored into the skeleton object in step 508, process flow moves to step 510 where the skeleton object is used in a call to a get_local_create_closure( ) operation. The skeleton object contains a fat pointer, or two "regular" pointers, namely a pointer to the dispatch function and a pointer to the local m-table. The get_local_create_closure( ) operation is arranged to return a closure object that, when invoked, returns a local-only server representation. Hence, the get_local_create_closure( ) operation is used by the ORB to create the server representation for local-only objects.

From step 510, process flow moves to step 512 in which an implementation definition object is created using substantially only the skeleton object. While a call that is made to create an implementation definition object may generally require a variety of different arguments to be passed, in the described embodiment, the skeleton object is essentially the only argument that is needed. The implementation definition object that is created is arranged to request only local-only object references. Once the implementation definition object is created, a get create closure is called on the implementation definition object in step 514.

The call to the get create closure on the implementation definition object causes a closure object to be returned to the caller, i.e., the object which called "new" in step 402 of FIG. 4, in step 516. The closure object that is returned generally contains a fat pointer. The fat pointer, in one embodiment, includes a pointer to the implementation definition object created in step 512, and a pointer to the create local-only server representation. The create local-only server representation is arranged to create a local-only server representation, e.g., the server-side representation discussed above with respect to step 408 of FIG. 4. In order for the create local-only server representation to create a server-side representation, the create local-only server representation, in one embodiment, needs the pointer to the implementation definition object.

The object returned in step 516 is a closure object because the object "contains" both a function, i.e., the create local-only server representation, and data, i.e., the implementation definition object, on which the function may be called. By "binding" the function to the data, the call to the function on the data argument may be deferred. The process of obtaining a local-only create closure is completed after the closure object is returned.

Figure 6:
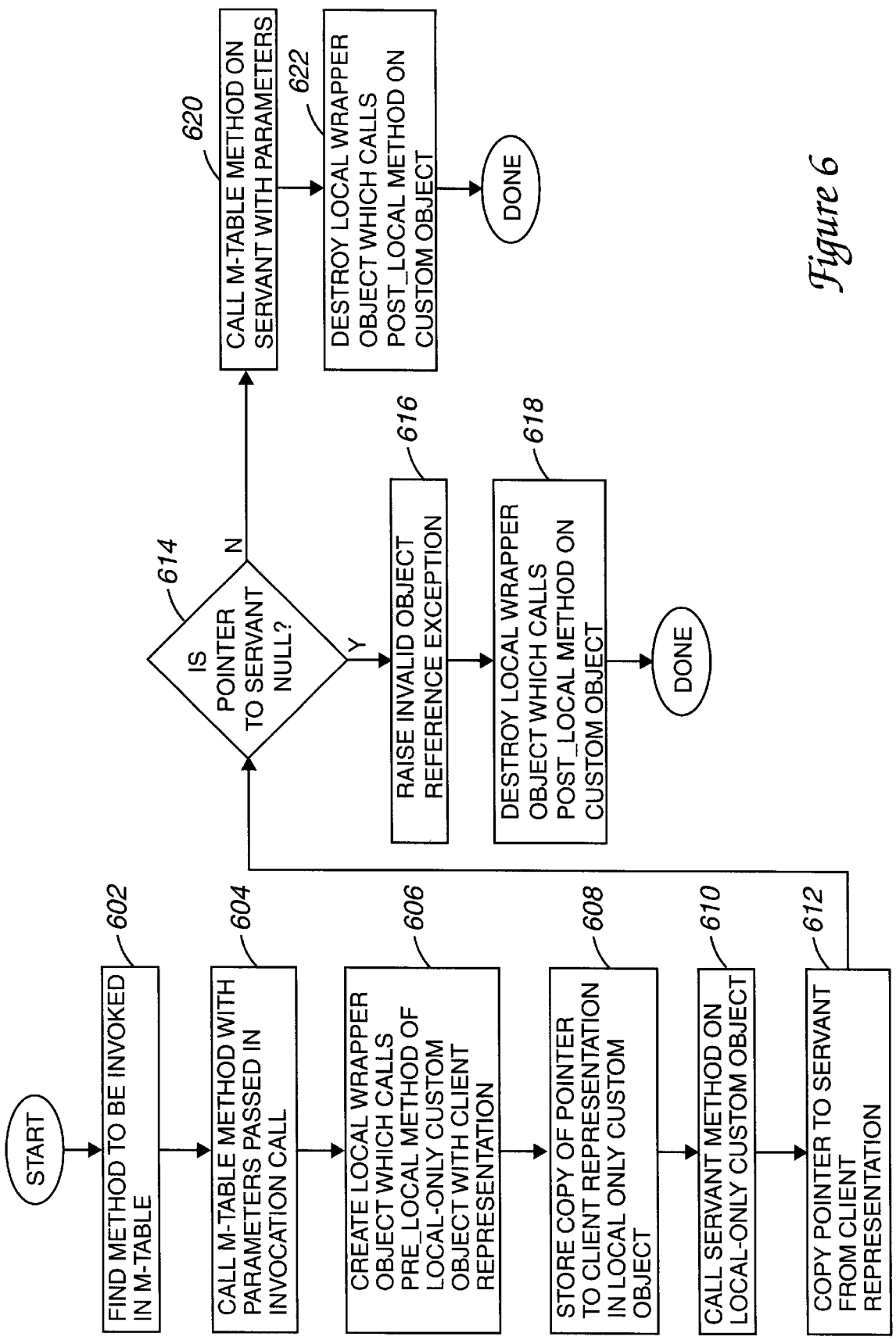
FIG. 6 is a process flow diagram which illustrates the steps associated with invoking a local-only object reference in accordance with an embodiment of the present invention.

A local-only object, as created using the process described above with reference to FIG. 4, generally appears, from the standpoint of other objects, to be the same as a standard CORBA object. The invocation of a local-only object is constrained to occur only from within the process in which the local-only object resides. With reference to FIG. 6, the steps associated with a local-only invocation will be described in accordance with an embodiment of the present invention. The process of invoking a method on a local-only object begins at step 602 in which the method that is to be invoked is located in the m-table, i.e., the local m-table, associated with the local-only object. Once the method is located, the located m-table method is called in step 604 with parameters which were passed in the invocation call.

After the m-table method is called, a local wrapper object is created in step 606. The local wrapper object may generally be created using any suitable method. The pre_local( ) method of the local-only custom object is called by the local wrapper object, with the client representation. In step 608, a copy of the pointer to the client representation is stored into the local-only custom object.

When the copy of the pointer to the client representation is stored into the local custom object, process flow proceeds to step 610 where a servant method is invoked, or otherwise called, on the local-only custom object. The servant method is invoked to obtain a pointer to the servant object. A temporary copy of the pointer to the servant is then made from the client representation in step 612. In the described embodiment, the temporary copy is made to ensure that the "reference" pointer is only read once.

This temporary copy is examined in step 614 regarding whether it is null, or otherwise essentially set to indicate the lack of an associated existent object reference. When the pointer to the servant is null, the implication is that the object reference identified by the pointer is not in existence. Accordingly, if the determination is that the pointer to the servant is null, then process flow moves from step 614 to step 616 in which an invalid object reference exception is raised, or thrown, to indicate that the object reference associated with the pointer to the servant has been revoke. After the invalid object reference exception is raised, then the local wrapper object which calls a post_local( ) method on the local-only custom object is destroyed in step 618. The process of invoking a method on a local-only object is completed.

If the determination in step 614 is that the pointer to the servant is not null, then in step 620, the method, i.e., the m-table method, is invoked on the servant using the parameters passed in the invocation call. After the method is invoked, then the local wrapper object which calls a post_local method on the local-only custom object is destroyed in step 618, and the process of invoking a method on a local-only object is completed.

Local-only objects support revocation, deactivation, and deletion of object references, as for example when clients associated with the object references are no longer needed. In one embodiment, a revocation method uses a server representation to mark object references as invalid. When an object reference is revoked, the relationship between the client and the local-only client object is essentially "erased," as will be described with respect to FIG. 7. That is, revoke operations typically cause object references for the object that is being revoked to become invalid. As such, subsequent invocations on an invalid object reference may result in an exception being raised. It should be appreciated that a release operation is generally called to "clean up," or otherwise delete, revoked object references. In the described embodiment, when an object is deactivated, associated pointers are cleared, and the servant object is marked to be deleted. However, the servant object will not be deleted, or otherwise destroyed, until substantially all client side object references for the servant are released.

Figure 7:
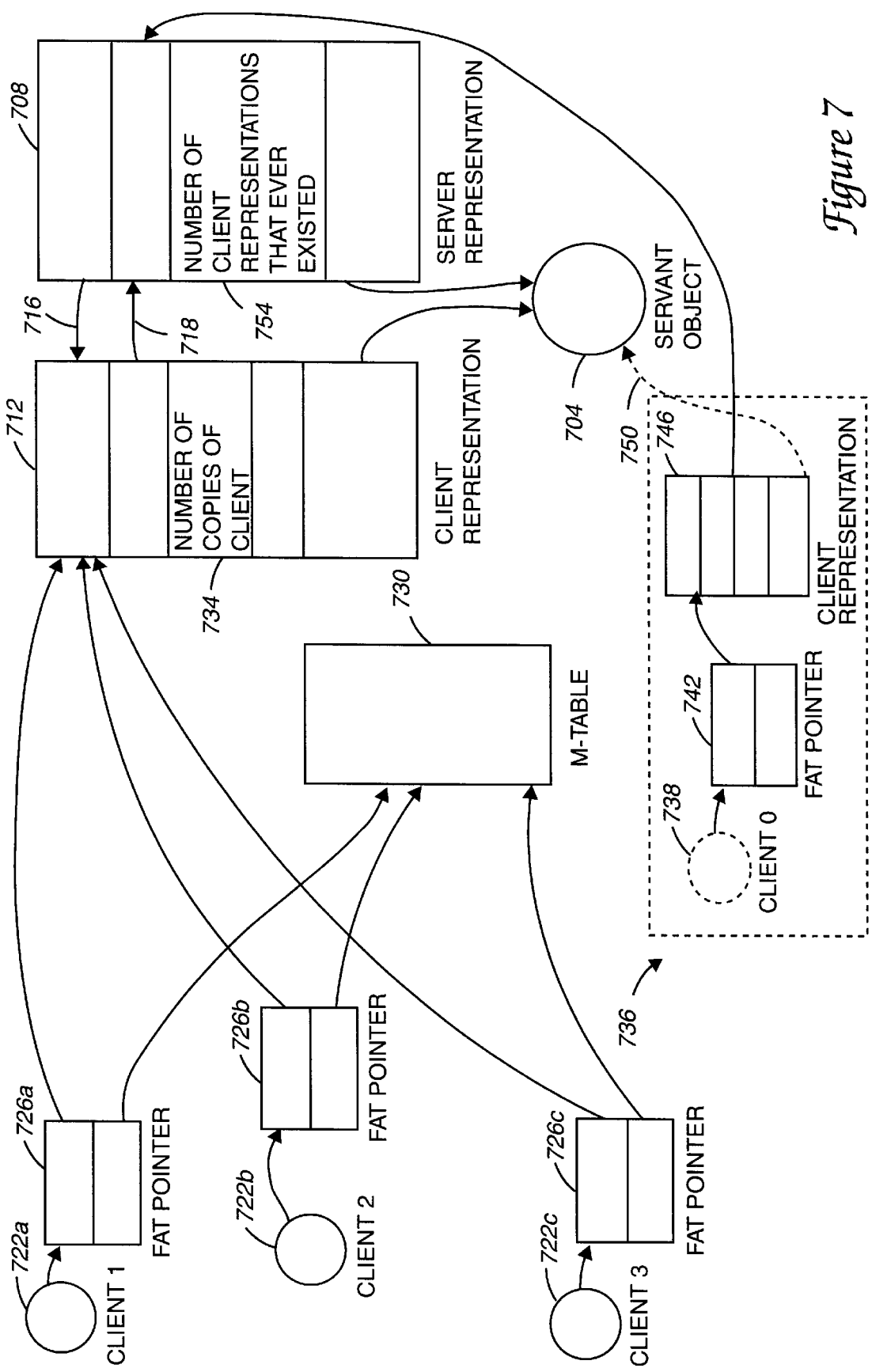
FIG. 7 is a diagrammatic representation of the structure of a process which includes a servant object, valid clients, and an invalid client which are within the same process as the servant object in accordance with an embodiment of the present invention.

FIG. 7 is a diagrammatic representation of a process in which a servant object and valid clients reside in accordance with an embodiment of the present invention. A local-only servant object 704 is pointed to by a server representation 708 and a client representation 712. Server representation 708 and client representation 712 also point to each other. That is, as shown, server representation 708 includes a pointer 716 to client representation 712, while client representation 712 includes a pointer 718 to server representation 708.

In the described embodiment, the current process includes three clients 722, i.e., three valid clients. Each client 722a–c is associated with a fat pointer 726a–c, or an object reference, respectively. As described above with respect to FIG. 3, fat pointers generally include a pointer to a client representation, e.g., client representation 712, and an m-table, such as a local m-table 730. Local m-table 730 may include a plurality of inter-related m-tables, as will be discussed below with reference to FIG. 8.

When server representation 708 is "asked" by the servant object for a client representation, a client representation, e.g., client representation 712, is created if no valid client representation is already in existence. Alternatively, if a valid client representation, e.g., client representation 712, exists when server representation 708 is asked for a client representation, copies of clients are made. Client representation 712 maintains data 734 which relates to the number of clients 722, or copies of clients, associated with client representation 712.

When a client is to be revoked, servant object 704 essentially "asks" server representation 708 to set the pointer from the client representation associated with the client to servant object 704 to null. As will be appreciated by those skilled in the art, if an attempt is made to invoke revoked client 738, an exception will typically be raised as arranged, since client representations check whether the pointer is non-null. When a client is revoked and a pointer from an associated client representation to servant object 704 is set to null, an invalid generation is created. An invalid generation 736 includes a revoked client 738, which has an associated fat pointer 742 and an associated client representation 746. In some embodiments, invalid generation 736 may include multiple revoked clients. Since a pointer 750 from client representation 746 to servant object 704 is set to null, or otherwise erased, client representation 746 is invalid.

Client representation 712 represents a new, or valid, generation since client representation 712 was created after client representation 746 was revoked. That is, in the described embodiment, with client representation 746 revoked, when server representation 708 is initially asked for an object reference after client representation 746 is invalidated, client representation 712 is created. Then, with client representation 712 being valid, any subsequent request for an object reference results in the creation of a copy of a client which references client representation 712, as previously mentioned. Therefore, clients 722 were created after client 738 and, hence, client representation 746, was revoked.

Server representation 708 includes data 754 which relates to the number of client representations which were ever associated with server representation 708. That is, data 754 relates to the total number of client representations which were ever in existence within the same process as servant object 704. It should be appreciated that a client representation may not be revoked, or deleted, until all clients which reference the client representation have been revoked. By way of example, client representation 712 may not be revoked until clients 722 have all been revoked. As such, until all clients 722 have been revoked, any newly created clients will be associated with client representation 712.

As described above with reference to FIG. 5, m-tables may be created when an m-table builder for a skeleton is called during the creation of a local-only object. In general, an IDL compiler generates templates for local m-table methods which are typically instantiated at compile time to create appropriate m-table methods which are associated with m-tables. Hence, the local m-tables may be generated at run-time. The structure of m-tables may be arranged such that the same m-table may essentially be re-used. That is, since many local methods may be associated with different local-only objects, local m-tables which share methods may be created to reduce the duplication of common methods.

Figure 8:
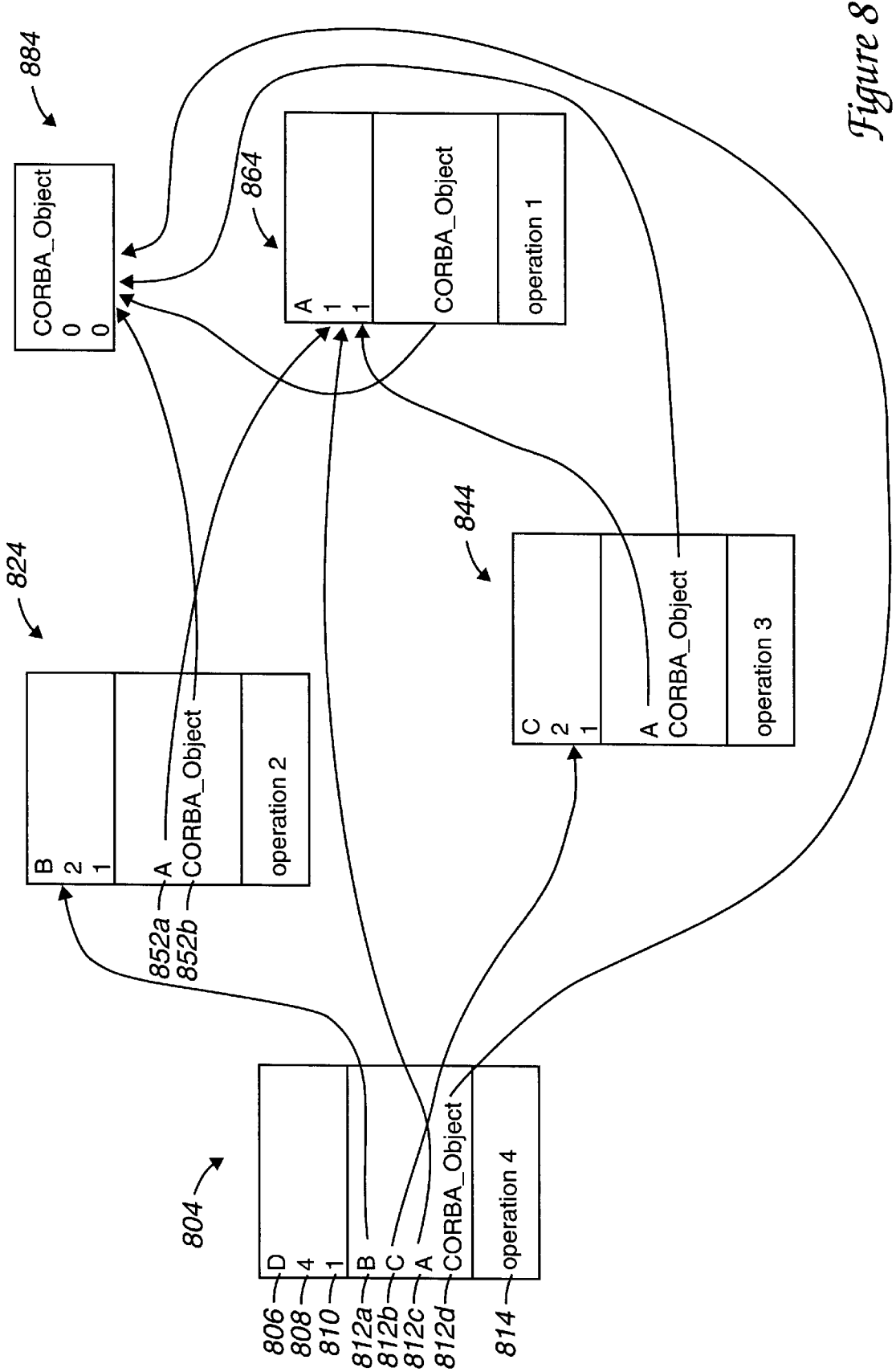
FIG. 8 is a diagrammatic representation of an m-table structure in accordance with an embodiment of the present invention.

With reference to FIG. 8, the construction of m-tables will be described in accordance with an embodiment of the present invention. Specifically, an m-table inheritance structure is shown in FIG. 8. Many m-tables may share common types. By way of example, an m-table for a type, or IDL interface, "C" may be associated with a type "A" as well as a CORBA_Object type, which is a standard constant defined in a CORBA environment. A type "D" may also be associated with type "C," type "A," and the CORBA-Object type. If an m-table for type "A" is created to be associated with the m-table for type "D" and the m-table for type "C," excessive copies of the m-table for type "A" may be created, thereby resulting in a proliferation of computer code. Therefore, allowing m-tables to be shared following an inheritance structure is generally more efficient than creating multiple m-tables for the same type.

A typical IDL interface structure may be a "diamond inheritance structure." In the described embodiment, an interface "A" inherits from a CORBA_Object. An interface "B" inherits from both interface "A" and the CORBA_Object. An interface "C" also inherits from interface "A" and the CORBA_Object. Finally, an interface "D" inherits from interface "A," interface "B," interface "C," and the CORBA_Object.

An m-table for interface "D" 804 includes a type indicator 806, a base class indicator 808 which is arranged to indicate the number of base classes, e.g., four, that m-table 804 inherits from, and an operations indicator 810 which indicates the number of operations associated with m-table 804. M-table 804 also includes pointers 812 to m-tables associated with the base classes, e.g., interfaces, from which m-table 804 inherits. As shown, m-table 804 includes a pointer 812a to an m-table for interface "B" 824, a pointer 812b to an m-table for interface "C" 844, a pointer 812c to an m-table for interface "A" 864, and an m-table for CORBA_Object 884. Any operations 814 associated with m-table 804 are also listed in m-table 804. In the described embodiment, m-table 804 is a local m-table and, hence, includes only local methods, or operations.

M-Table 824, like m-table 804, also includes pointers 852 to m-table 864 and m-table 884. In other words, interface "B" inherits from interface "A" and the CORBA_Object, and, hence, m-table 824 includes a pointer 852a to m-table 864 and a pointer 852b to m-table 884. Likewise, m-table 844 also includes pointers 872a and 872b to m-table 864 and m-table 884, respectively. As such, both m-table 864 and m-table 884 are shared by multiple m-tables, thereby creating a diamond inheritance structure between the associated m-tables.

Figure 9:
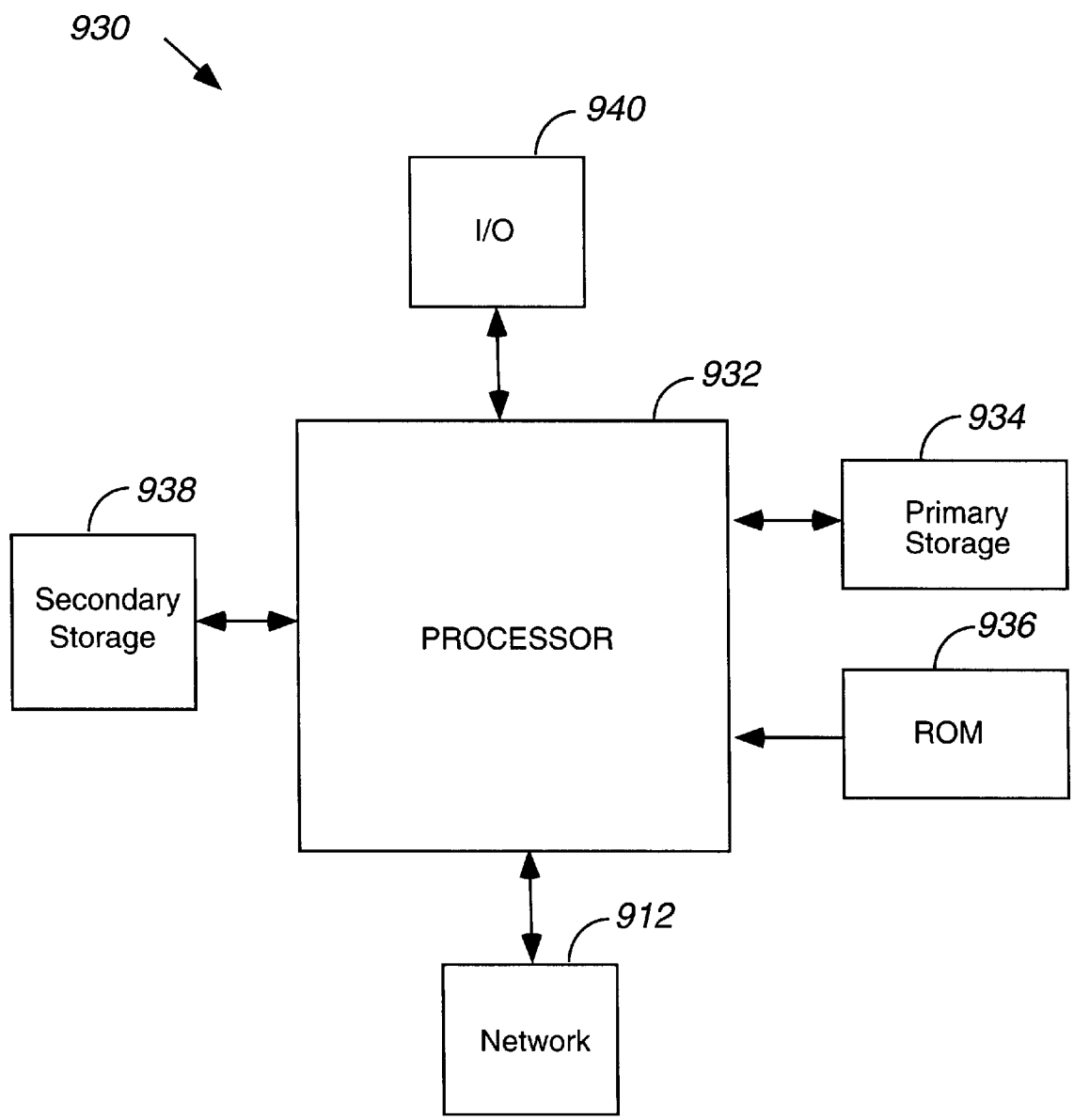
FIG. 9 is a diagrammatic representation of a computer system suitable for implementing the present invention.

FIG. 9 illustrates a typical, general-purpose computer system suitable for implementing the present invention. The computer system 930 includes a processor 932 (also referred to as a central processing units, or CPU) that is coupled to memory devices including primary storage devices 936 (typically a read only memory, or ROM) and primary storage devices 934 (typically a random access memory, or RAM).

As is well known in the art, ROM acts to transfer data and instructions uni-directionally to CPU 932, while RAM is used typically to transfer data and instructions in a bi-directional manner. Both storage devices 934, 936 may include any suitable computer-readable media. A secondary storage medium 938, which is typically a mass memory device, is also coupled bi-directionally to CPU 932 and provides additional data storage capacity. The mass memory device 938 is a computer-readable medium that may be used to store programs including computer code, data, and the like. Typically, mass memory device 938 is a storage medium such as a hard disk or a tape which generally slower than primary storage devices 934, 936. Mass memory storage device 938 may take the form of a magnetic or paper tape reader or some other well-known device. It will be appreciated that the information retained within the mass memory device 938, may, in appropriate cases, be incorporated in standard fashion as part of RAM 936 as virtual memory. A specific primary storage device 934 such as a CD-ROM may also pass data uni-directionally to the CPU 932.

CPU 932 are also coupled to one or more input/output devices 940 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 932 optionally may be coupled to a computer or telecommunications network, e.g., an internet network, or an intra-net network, using a network connection as shown generally at 912. With such a network connection, it is contemplated that CPU 932 might receive information from the network, or might output information to the network in the course of performing the above-described method steps. Such information, which is often represented as a sequence of instructions to be executed using CPU 932, may be received from and outputted to the network, for example, in the form of a computer data signal embodied in a carrier wave. The above-described devices and materials will be familiar to those of skill in the computer hardware and software arts.

In one embodiment, sequences of instructions may be executed substantially simultaneously on CPU 932 and other CPUs, as for example a CPU which is in communication with CPU 932 across network connection 912. Specifically, the above-described method steps may be performed across a computer network.

Although only a few embodiments of the present invention have been described, it should be understood that the present invention may be embodied in many other specific forms without departing from the spirit or the scope of the present invention. By way of example, the steps associated with the creation of a local-only object reference may be widely varied. Steps may be reordered, added, and removed within the scope of the present invention. Similarly, the steps associated with invoking a local-only object reference may also be reordered, added, and removed without departing from the spirit or the scope of the present invention.

Local m-tables have been described as having a diamond inheritance structure. However, substantially any suitable m-table inheritance structure may typically be used in the implementation of the present invention. In some embodiments, m-tables which are not shared may also be implemented in accordance with the present invention. Further, it should be appreciated that the contents of an m-table may generally be widely varied.

In one embodiment, the use of pointers which are set to null has been described as indicating the lack of existent objects identified by the pointers. However, it should be appreciated that in lieu of pointers which are null, pointers may be set in a variety of different ways to indicate the validity or existence of any associated objects, client representations, or object references. By way of example, a pointer may be set to a particular value to indicate that the client representation "identified" by the pointer is not valid without departing from the spirit or the scope of the present invention.

While the use of the fast, local-only objects has been described as being suitable for use on distributed object systems, it should be appreciated that the local-only objects may be implemented for use with substantially any object-based system. Specifically, a local-only object, as described above, may generally be implemented for use as a part of any suitable object-based system in which the clients that are arranged to invoke the object are local to the object. Therefore, the present examples are to be considered as illustrative and not restrictive, and the invention is not to be limited to the details given herein, but may be modified within the scope of the appended claims along with their full scope of equivalents.

What is claimed is:

1. In a object-based computing system, a computer-implemented method for creating an object reference, wherein the object reference is associated with a local-only servant object, the method comprising:

implementing a first base class to create a first object that represents the object reference, wherein the first base class is associated with an object request broker;

obtaining a local-only create closure; and calling an operation on a second base class, the operation being called with the local-only create closure, wherein the operation is arranged to create a server-side representation associated with the local-only servant object, the server-side representation being arranged to be stored in the first object that represents the object reference.

2. A method as recited in claim 1 wherein obtaining the local-only create closure includes:

creating a skeleton object;

calling a local m-table builder for the skeleton object, wherein the local m-table builder is called with a local-only custom object class; and creating a local closure object with the skeleton object.

3. A method as recited in claim 2 wherein obtaining the local-only create closure further includes:

creating an implementation definition object associated with the skeleton object; and setting a pointer from the local closure object to the implementation definition object.

4. A method as recited in claim 2 wherein calling the local m-table builder includes creating an inheritance structure of m-tables.

5. A method as recited in claim 1 further including:

setting a pointer from the object reference to the server-side representation.

6. A method as recited in claim 1 further including determining whether a first pointer from the first object to the local-only servant object is set to a first value;

raising an exception when it is determined that the first pointer is not set to the first value, wherein the exception is arranged to indicate that the first pointer is not set to the first value; and calling a first method on the local-only servant object when it is determined that the first pointer is set to the first value.

7. A method as recited in claim 6 further including:

calling a servant method on the first object.

8. A method as recited in claim 7 further including:

calling a pre-local method associated with the first object, wherein the pre-local method is called with a client representation associated with the local-only servant; and storing a copy of the second pointer to the client representation in the first object.

9. A method as recited in claim 8 further including:

copying the second pointer, wherein first pointer is the copy of the second pointer.

10. A method as recited in claim 8 further including invoking a post-local method associated with the first object, wherein the post-local method is associated with the pre-local method.

11. A method as recited in claim 8 wherein calling the pre-local method includes storing a copy of the server-side representation associated with the local-only servant object with respect to the client representation.

12. A method as recited in claim 7 further including:

receiving an invocation call on the first object;

locating a first method associated with the invocation call, the method being included in an m-table associated with the first object; and calling the first method.

13. A method as recited in claim 1 wherein the local-only servant object is not marshaled.

14. A method as recited in claim 13 wherein the local-only servant object is not synchronized.

15. A computer system arranged to create an object reference, wherein the object reference is associated with a local-only servant object, the computer system comprising:

a processor;

a first base class arranged to create a first object that represents the object reference, wherein the first base class is associated with an object request broker;

a local-only create closure; and a second base class, the second base class including an operation that is arranged to be called with the local-only create closure, wherein the operation is arranged to create a server-side representation associated with the local-only servant object, the server-side representation being arranged to be stored in the first object that represents the object reference.

16. A computer system as recited in claim 15 further including:

an object request broker, a skeleton object;

a local-only custom object class, the local-only custom object class being associated with the object request broker; and a local m-table builder associated with the skeleton object, wherein the local m-table builder is arranged to be called with the local-only custom object class.

17. A computer system as recited in claim 16 further including:

an implementation definition object associated with the skeleton object; and a pointer from the local closure object to the implementation definition object.

18. A computer system as recited in claim 15 further including:

a pointer from the first object to the server-side representation.

19. A computer program product for creating an object reference, wherein the object reference is associated with a local-only servant object, the method comprising:

computer code that implements a first base class to create a first object that represents the object reference, wherein the first base class is associated with an object request broker;

computer code that obtains a local-only create closure;

computer code that calls an operation on a second base class, the operation being called with the local-only create closure, wherein the operation is arranged to create a server-side representation associated with the local-only servant object, the server-side representation being arranged to be stored in the first object that represents the object reference; and a computer readable medium that stores the computer codes.

20. A computer program product as recited in claim 19 wherein the computer code that obtains the local-only create closure includes:

computer code that creates a skeleton object;

computer code that calls a local m-table builder for the skeleton object, wherein the local m-table builder is called with a local-only custom object class; and computer code that creates a local closure object with the skeleton object.

21. A computer program product as recited in claim 20 wherein the computer code that calls the local m-table builder includes computer code that creates an inheritance structure of m-tables.

22. A computer program product as recited in claim 20 further including:

computer code that sets a pointer from the object reference to the server-side representation.

23. A computer program product as recited in claim 20 wherein the computer readable medium is a data signal embodied in a carrier wave.

24. A method for creating an object reference in an object-based computing system, wherein the object reference is associated with a local-only servant object, the method comprising:

implementing a first base class to create a first object that represents the object reference, wherein the first base class is associated with an object request broker;

obtaining a local-only create closure, the local-only create closure being arranged to create a server-side representation which is stored in the local-only servant object; and calling an operation on a second base class, the operation being called with the local-only create closure, wherein the operation is arranged to create a server-side representation associated with the local-only servant object, the server-side representation being arranged to be stored in the first object that represents the object reference.

25. In a object-based computing system, a method of creating an object reference associated with a local-only servant object that can only be invoked locally, the method comprising:

obtaining a local-only create closure; and calling an operation on a base class, wherein the operation is arranged to create a server-side representation associated with the local-only servant object, the server-side representation being arranged to be stored in the first object that represents the object reference; and wherein, the calling of the operation is performed by the local-only create closure.

\* \* \* \* \*